US012638758B2

(12) United States Patent
Yamagishi et al.

(10) Patent No.: US 12,638,758 B2
(45) Date of Patent: May 26, 2026

(54) PHOSPHOR WHEEL DEVICE INCLUDING HEAT EXCHANGER, AND PROJECTION IMAGE DISPLAY DEVICE

(71) Applicant: Panasonic Intellectual Property Management Co., Ltd., Osaka (JP)

(72) Inventors: Shigekazu Yamagishi, Osaka (JP); Yusaku Nishikawa, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 768 days.

(21) Appl. No.: 17/952,636

(22) Filed: Sep. 26, 2022

(65) Prior Publication Data

US 2023/0100903 A1     Mar. 30, 2023

(30) Foreign Application Priority Data

Sep. 28, 2021     (JP) ................................. 2021-158345

(51) Int. Cl.
G03B 21/16          (2006.01)
G03B 21/20          (2006.01)

(52) U.S. Cl.
CPC ........... G03B 21/16 (2013.01); G03B 21/204 (2013.01)

(58) Field of Classification Search
CPC ..... G03B 21/16; G03B 21/204; H04N 9/3144
See application file for complete search history.

(56) References Cited

U.S. PATENT DOCUMENTS 8,678,597 B2 *   3/2014   Nishimura ............. G03B 21/16
                                                353/60
9,335,616 B2 *   5/2016   Lin ...................... H04N 9/3144
                    (Continued)

FOREIGN PATENT DOCUMENTS

JP          2003-337380          11/2003
JP          2005-249950          9/2005
                    (Continued)

OTHER PUBLICATIONS

Office Action issued Jul. 8, 2025 in corresponding Japanese Patent Application No. 2021-158345, with machine translation.
(Continued)

*Primary Examiner* — Bao-Luan Q Le
(74) *Attorney, Agent, or Firm* — Wenderoth, Lind & Ponack, L.L.P.

(57)          ABSTRACT

A phosphor wheel device includes a phosphor wheel, a housing that accommodates the phosphor wheel, and a heat exchanger. A circulating gas flows between the housing and the heat exchanger. The housing includes a circulation fan, a first space in which the circulation fan is disposed, a second space in which gas is sent from the first space by the circulation fan, a third space in which the phosphor wheel is disposed, a first opening giving communication between the heat exchanger and the first space, a second opening giving communication between the first space and the second space, a third opening giving communication between the second space and the third space, and a fourth opening giving communication between the third space and the heat exchanger. The heat exchanger includes a circulation flow path through which circulating gas flows and an outside gas flow path through which outside gas flows.

13 Claims, 10 Drawing Sheets

(56) References Cited

U.S. PATENT DOCUMENTS

| | | | | |
|---|---|---|---|---|
| 9,733,556 B2 * | 8/2017 | Egawa | | H04N 9/3158 |
| 9,995,996 B2 * | 6/2018 | Masuda | | F21V 29/77 |
| 10,401,014 B2 * | 9/2019 | Hu | | G02F 1/1336 |
| 10,527,840 B2 * | 1/2020 | Yoshikawa | | G02B 5/20 |
| 10,663,845 B2 * | 5/2020 | Deng | | H04N 9/3144 |
| 2012/0013854 A1 * | 1/2012 | Nishimura | | G03B 21/16 |
| | | | | 353/57 |
| 2015/0029472 A1 * | 1/2015 | Lin | | H04N 9/3144 |
| | | | | 353/56 |
| 2016/0069558 A1 * | 3/2016 | Hu | | G02F 1/1336 |
| | | | | 362/84 |
| 2016/0291449 A1 * | 10/2016 | Masuda | | F21V 29/502 |
| 2016/0349605 A1 | 12/2016 | Kitade | | |
| 2017/0010523 A1 * | 1/2017 | Egawa | | G03B 21/16 |
| 2018/0011392 A1 | 1/2018 | Utsunomiya | | |
| 2018/0088317 A1 * | 3/2018 | Yoshikawa | | G02B 5/20 |
| 2019/0353993 A1 | 11/2019 | Ikeo | | |
| 2023/0236484 A1 * | 7/2023 | Banno | | G03B 21/16 |
| | | | | 353/57 |

FOREIGN PATENT DOCUMENTS

| | | |
|---|---|---|
| JP | 2008-170774 | 7/2008 |
| JP | 2008-217041 | 9/2008 |
| JP | 2018-022000 | 2/2018 |
| JP | 2020-16749 | 1/2020 |
| WO | 2016/121028 | 8/2016 |
| WO | 2016/147226 | 9/2016 |
| WO | 2018/159536 | 9/2018 |

OTHER PUBLICATIONS

Notice of Reasons for Refusal issued Feb. 10, 2026 in corresponding Japanese Patent Application No. 2021-158345, with machine translation.

* cited by examiner (a)

(b)

(a)

(b)

(a)

(b)

(a)

(b)

PHOSPHOR WHEEL DEVICE INCLUDING HEAT EXCHANGER, AND PROJECTION IMAGE DISPLAY DEVICE

BACKGROUND

1. Technical Field

The present disclosure relates to a phosphor wheel device used in an illumination system of a projection image display device, and more particularly to a phosphor wheel device including a heat exchanger, and a projection image display device including such a phosphor wheel device.

2. Description of the Related Art

In recent years, a solid-state laser light source such as a semiconductor laser element is mainly used for a projection image display device. A high-power device in which a plurality of semiconductor laser elements are arrayed and integrated is also provided. Use of such a semiconductor laser element array makes it possible to provide a projection image display device having a high power exceeding 5000 lumens, for example.

Among the semiconductor laser elements, in particular, a semiconductor laser element that generates blue light is excellent in terms of efficiency and power. In a projection image display device, in order to obtain white light, a configuration in which a semiconductor laser element that generates blue light and a phosphor that generates yellow light from blue light are combined is mainly used.

SUMMARY

It is required to increase output power of a projection image display device equipped with a solid-state laser light source. However, only part of the energy of light incident on the phosphor is converted into fluorescent light as light energy, and the rest is emitted as thermal energy. Heat generation of the phosphor by this thermal energy causes a decrease in fluorescent light conversion efficiency of the phosphor and damage to optical elements around the phosphor. Therefore, a configuration for cooling the heated phosphor is required.

In order to cool the heated phosphor, a configuration is adopted in which the effective surface area of the phosphor is widened and heat exchange with air is promoted by forming the phosphor in an annular shape on the surface of a disk-shaped substrate and rotating the phosphor by a motor (in the present description, such a configuration is referred to as "phosphor wheel device"). In recent years, there has been a demand for higher luminance of a projection image display device, and there has been a need for a phosphor for converting incident light with high efficiency and a cooling unit for the phosphor.

In view of such problems, for example, the disclosure of WO 2018/159536 A has been conventionally proposed.

In the case of the phosphor wheel device of WO 2018/159536 A, the phosphor wheel is accommodated in a sealed case and a heat absorber is attached to the case for dustproof and soundproofing. The heat absorber encloses water as a refrigerant, and the enclosed water moves between the heat absorber in the case and a heat exhauster disposed outside the case via a heat pipe, and due to this, heat generated by the phosphor is discharged from the case.

There is a demand for further cost reduction and downsizing of a projection image display device, and a conventional phosphor wheel device is required to have a configuration capable of cooling a phosphor that generates heat inexpensively.

Therefore, an object of the present disclosure is to solve the above problem, and to provide a phosphor wheel device capable of cooling a phosphor that has generated heat inexpensively.

In order to achieve the above object, a phosphor wheel device according to the present disclosure includes a phosphor wheel, a housing that accommodates the phosphor wheel, and a heat exchanger. A circulating gas flows between the housing and the heat exchanger. The housing includes a circulation fan, a first space in which the circulation fan is disposed, a second space in which gas is sent from the first space by the circulation fan, a third space in which the phosphor wheel is disposed, a first opening giving communication between the heat exchanger and the first space, a second opening giving communication between the first space and the second space, a third opening giving communication between the second space and the third space, and a fourth opening giving communication between the third space and the heat exchanger. The heat exchanger includes a circulation flow path through which circulating gas flows and an outside gas flow path through which outside gas blown from the outside flows. The housing forms a circulation path through which the circulating gas sequentially passes through the first space, the second space, and the third space, the circulation path and the circulation flow path form a closed flow path through which the circulating gas flows, and the circulation flow path and the outside gas flow path are configured such that the circulating gas and the outside gas flow in thermal contact with each other without being mixed.

The phosphor wheel device according to one aspect of the present disclosure has a configuration with improved space efficiency, and can cool a phosphor that has generated heat inexpensively.

DETAILED DESCRIPTION

Figure 1:
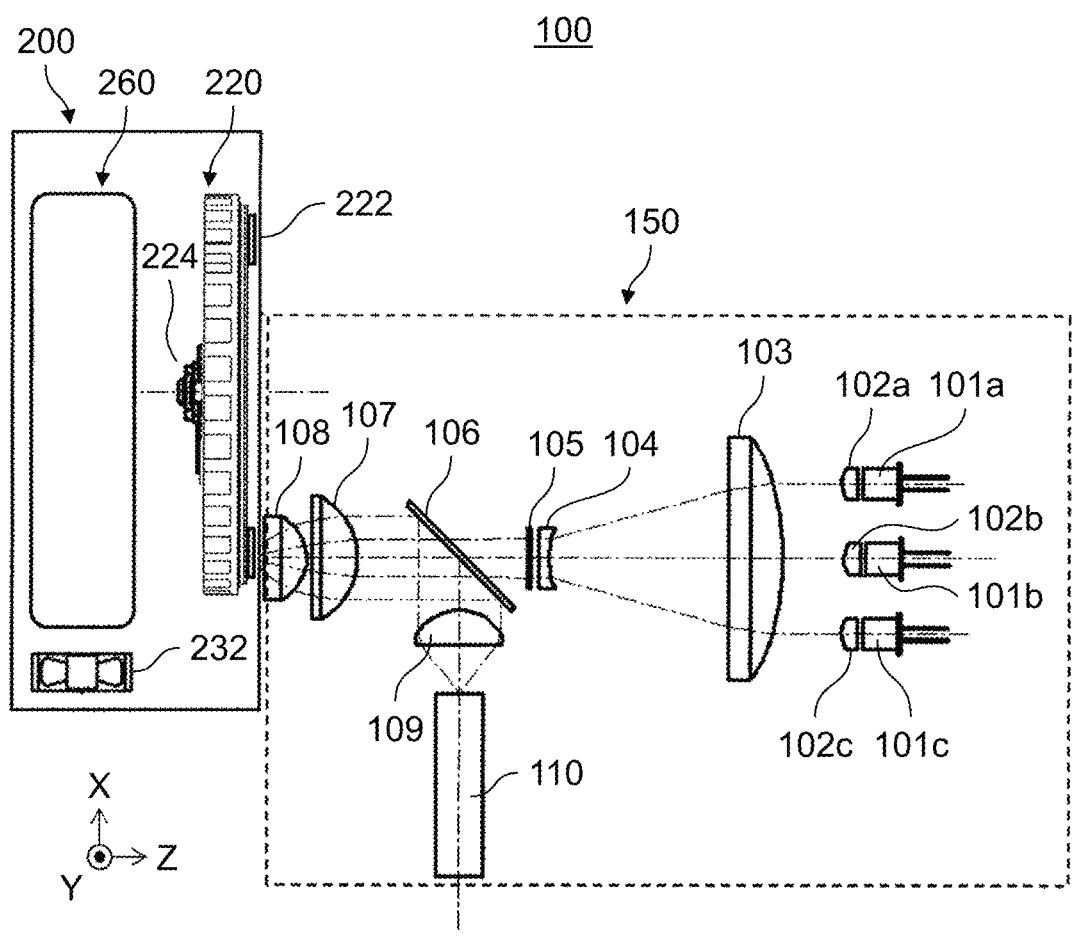
FIG. 1 is a schematic view showing a configuration of an illumination system including a phosphor wheel device according to a first exemplary embodiment.

According to a first aspect of the present disclosure, there is provided a phosphor wheel device including: a housing that accommodates a phosphor wheel; and a heat exchanger that allows a flow of a circulating gas to communicate with the housing, in which the housing includes a first space having a circulation fan, a second space blown from the first space by the circulation fan, a third space in which the phosphor wheel is disposed, a first opening that gives communication between the heat exchanger and the first space, a second opening that gives communication between the first space and the second space, a third opening that gives communication between the second space and the third space, and a fourth opening that gives communication between the third space and the heat exchanger, the heat exchanger includes a circulation flow path through which the circulating gas flows, and an outside gas flow path through which an outside gas blown from an outside flows, and the housing forms a circulation path through which the circulating gas sequentially passes through the first space, the second space, and the third space, the circulation path and the circulation flow path configure a closed flow path through which the circulating gas flows, and the circulation flow path and the outside gas flow path are configured to cause the circulating gas and the outside gas to flow in thermal contact with each other without being mixed with each other.

According to this aspect, it is possible to provide a phosphor wheel device that has a configuration with improved space efficiency and can cool a phosphor that has generated heat inexpensively.

According to a second aspect of the present disclosure, there is provided the phosphor wheel device according to the first aspect, in which the heat exchanger includes a corrugated plate, the corrugated plate has a shape in which thin plates are repeatedly bent with alternately changing orientation, zigzag-shaped end surfaces are disposed at both ends of the heat exchanger, the circulation flow path and the outside gas flow path communicate with each other between the both ends of the heat exchanger and are in contact with only each of one surface and the other surface of the corrugated plate along a direction of communication, and the circulating gas and the outside gas flow between the both ends.

According to a third aspect of the present disclosure, there is provided the phosphor wheel device according to the second aspect, in which the circulation flow path is configured to cause the circulating gas to flow from one end toward the other end of both ends, and the outside gas flow path is configured to cause the outside gas to flow from the other end toward the one end.

According to a fourth aspect of the present disclosure, there is provided the phosphor wheel device according to the second or third aspect, in which both ends of the heat exchanger are located near respective both ends in a longitudinal direction of the housing.

According to a fifth aspect of the present disclosure, there is provided the phosphor wheel device according to any one of the first to fourth aspects, in which the phosphor wheel includes a rotating substrate, a phosphor layer is disposed on a first surface of the substrate, a plurality of convex blades are provided rotationally symmetrically on a second surface opposing the first surface, and the second surface is disposed facing the second opening.

According to a sixth aspect of the present disclosure, there is provided the phosphor wheel device according to the fifth aspect, in which the third opening is smaller than the substrate and is disposed toward a center of the substrate.

According to a seventh aspect of the present disclosure, there is provided the phosphor wheel device according to any one of the first to sixth aspects, in which the circulation fan is disposed such that the discharge port is closely connected to the second opening.

According to an eighth aspect of the present disclosure, there is provided the phosphor wheel device according to any one of the first to seventh aspects, in which the circulation fan is a sirocco fan.

According to a ninth aspect of the present disclosure, there is provided the phosphor wheel device according to any one of the first to eighth aspects, in which the circulation flow path is disposed adjacent to an upper surface or one side surface of the housing.

According to a tenth aspect of the present disclosure, there is provided a projection image display device including: an illumination system including a light source and the phosphor wheel device according to any one of the first to ninth aspects: a light modulation element that spatially modulates incident light from the illumination system and generates image light according to image information; and a projection optical system that projects and displays the image light having been generated.

Note that by appropriately combining discretionary exemplary embodiments among the various exemplary embodiments described above, the effects of the respective exemplary embodiments can be achieved.

Hereinafter, exemplary embodiments will be described in detail with appropriate reference to the drawings. However, unnecessarily detailed description may be omitted. For example, detailed explanations on the matters that are already well known, and redundant explanations about the configurations that are substantially identical will be sometimes omitted. This is to avoid an unnecessarily redundant description below and to facilitate understanding of a person skilled in the art.

A phosphor wheel device according to a first exemplary embodiment of the present disclosure will be described with reference to FIGS. 1 to 10. The accompanying drawings and the following description are provided for those skilled in the art to fully understand the present disclosure, and are not intended to limit the subject matter described in the claims. In each drawing, elements are exaggerated in order to facilitate explanation.

First Exemplary Embodiment (Configuration of Illumination System 100)

An example of illumination system 100 according to the first exemplary embodiment of the present disclosure will be described with reference to FIG. 1. FIG. 1 is a schematic view showing the configuration of illumination system 100 including phosphor wheel device 200 according to the first exemplary embodiment.

With reference to FIG. 1, illumination system 100 includes optical system 150 and phosphor wheel device 200. Phosphor wheel device 200 includes phosphor wheel 220, and phosphor layer 222 provided on phosphor wheel 220 receives blue light emitted from optical system 150 and generates fluorescent light of yellow light.

As shown in FIG. 1, optical system 150 of illumination system 100 includes semiconductor laser elements 101a, 101b, 101c, collimating lenses 102a, 102b, 102c, afocal lenses 103, 104, lenses 107, 108, 109, diffuser plate 105, dichroic mirror 106, and rod integrator 110. Phosphor wheel device 200 includes phosphor wheel 220, heat exchanger 260, and fan 232.

In optical system 150, semiconductor laser elements 101a to 101c may be laser light sources that generate blue light. Blue light emitted by semiconductor laser elements 101a to 101c is emitted in the −Z-direction in the figure, collimated by collimating lenses 102a to 102c, then focused by afocal lenses (hereinafter used as lenses constituting the afocal optical system) 103 and 104, and incident on diffuser plate 105. The incident blue light is diffused by diffuser plate 105, and then enters dichroic mirror 106.

Dichroic mirror 106 has a characteristic of transmitting blue light and reflecting other color component light, and is disposed to be inclined by 45 degrees with respect to the optical axis of incident light. The blue light incident on and transmitted through dichroic mirror 106 from diffuser plate 105 is incident on phosphor wheel device 200 through lenses 107, 108.

In phosphor wheel device 200, as shown in FIG. 1, phosphor wheel 220 is rotated by driving of motor device 224, and annular phosphor layer 222 disposed on a front surface of phosphor wheel 220 is excited by incident blue light and generates fluorescent light of yellow light. By rotating phosphor wheel 220, it is avoided that one point of phosphor layer 222 is intensively illuminated with blue light, and deterioration of phosphor particles contained in the phosphor layer due to heat generation by irradiation of blue light is suppressed. The configuration of phosphor wheel device 200 will be described in detail later.

Next, the yellow light generated by phosphor layer 222 is incident on dichroic mirror 106 in the Z-direction in the figure via lenses 107, 108. The incident yellow light is reflected by dichroic mirror 106, travels in the −X-direction, and is condensed by lens 109 on an incident surface of rod integrator 110 having a rectangular opening arranged in front of lens 109.

Thus, use of phosphor wheel device 200 makes it possible to generate yellow light from blue light from the light source. The phosphor particles contained in phosphor layer 222 are not limited to yellow phosphor particles, and may be other phosphor particles having different emission colors, such as red phosphor particles or green phosphor particles. Illumination system 100 may include a lens array including a plurality of lenses instead of rod integrator 110.

(Configuration of Phosphor Wheel Device 200)

Figure 2:
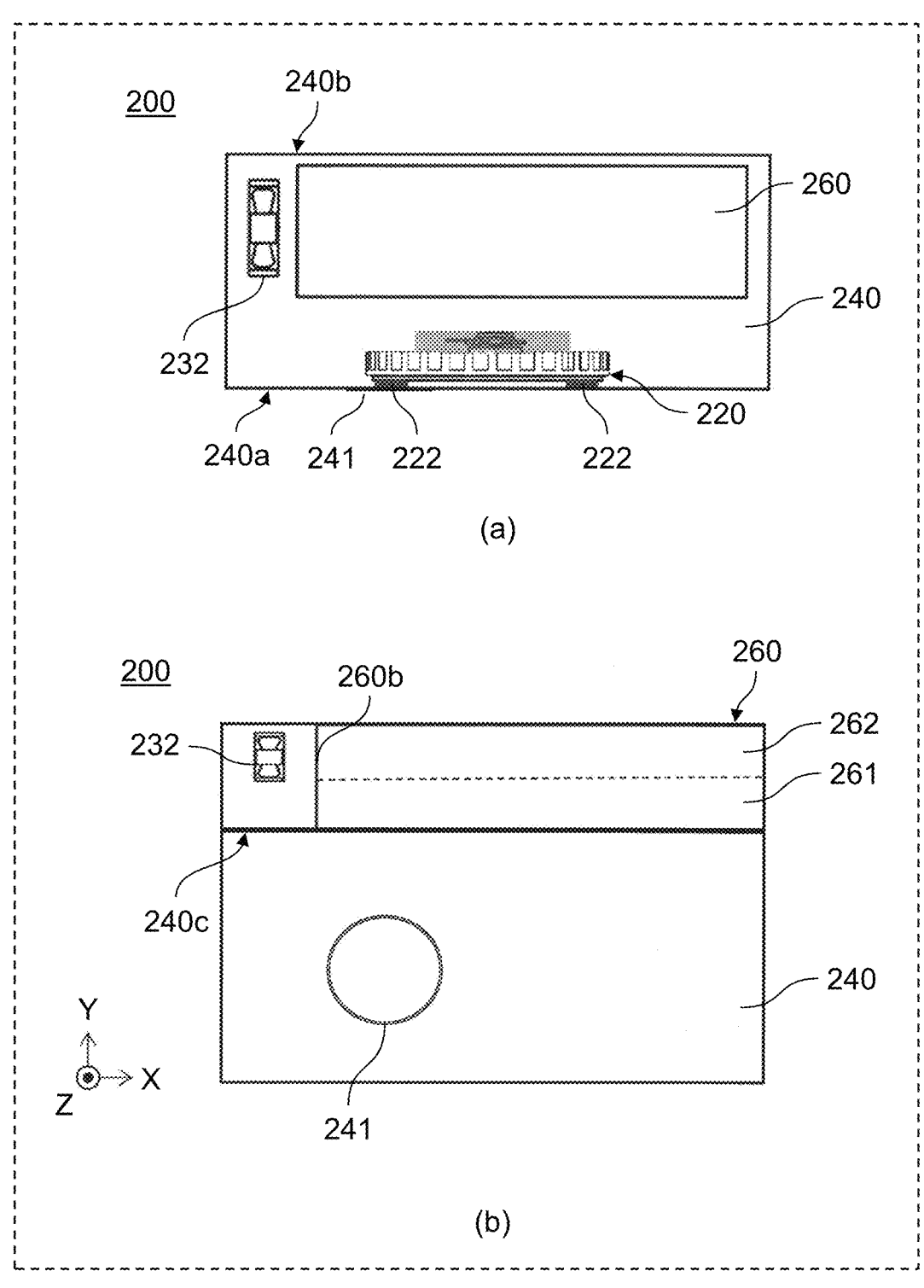
FIG. 2 is a plan view (a) and a front view (b) showing an example of the phosphor wheel device of FIG. 1.

The configuration of phosphor wheel device 200 will be described with reference to FIG. 2. FIG. 2 is a plan view (a) and a front view (b) showing an example of phosphor wheel device 200 of FIG. 1. Note that, in FIG. 2A, in order to facilitate the explanation, phosphor wheel 220 accommodated in phosphor wheel device 200 is shown with the housing of phosphor wheel device 200 transmitted.

As shown in FIG. 2, phosphor wheel device 200 includes housing 240 that accommodates phosphor wheel 220 inside housing 240, heat exchanger 260, and fan 232. Housing 240 has a substantially rectangular parallelepiped shape, and has front surface 240a, rear surface 240b, and upper surface 240c. Phosphor wheel 220 is installed near an inner side of front surface 240a of housing 240, and is provided such that opening 241 corresponds to a position of phosphor layer 222 on front surface 240a in order to receive incident light from a light source and emit fluorescent light.

Figure 6:
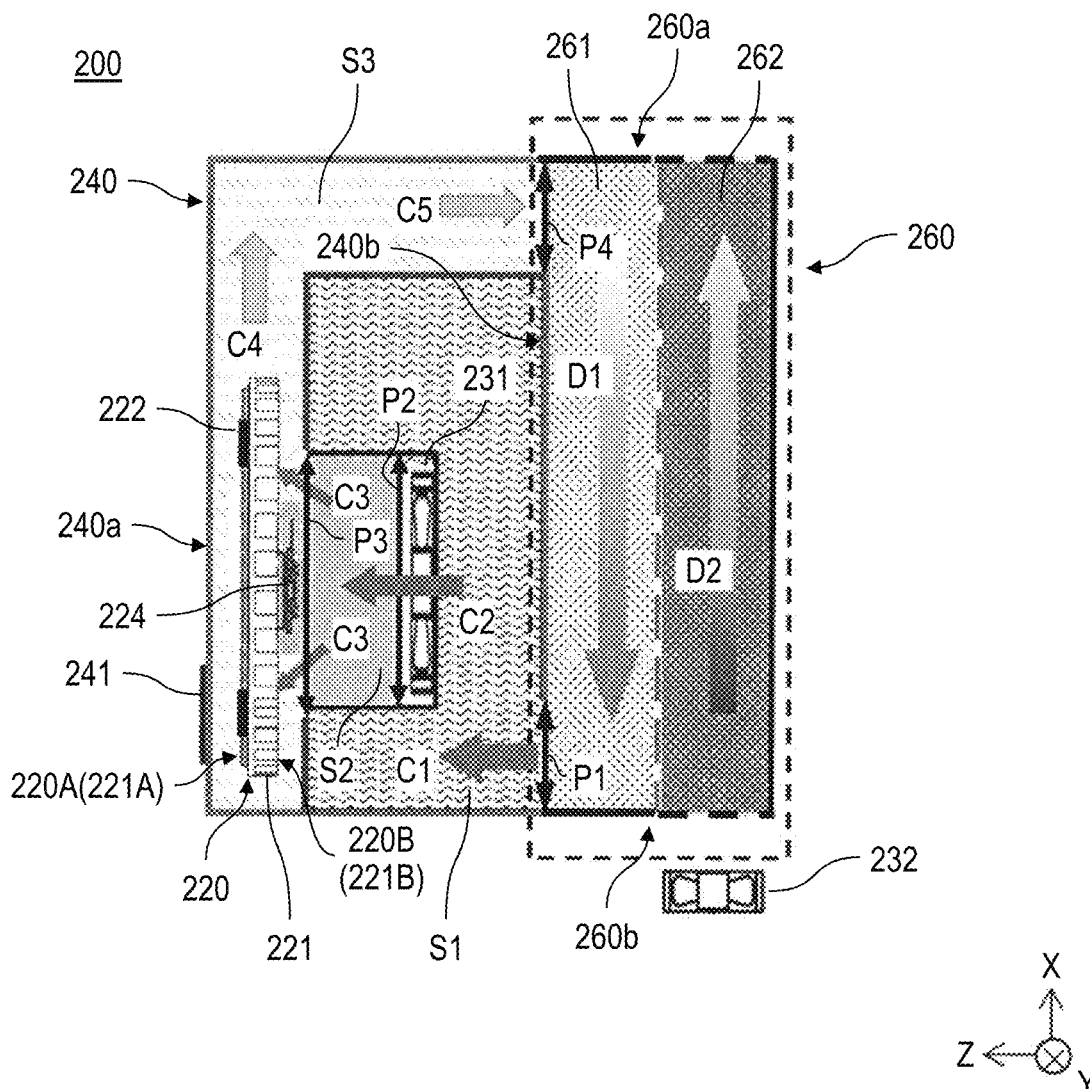
FIG. 6 is a view showing an example of a circulation path in the phosphor wheel device of FIG. 1.

Heat exchanger 260 is disposed adjacent to housing 240, and in the present exemplary embodiment, heat exchanger 260 is disposed adjacent to upper surface 240c of housing 240. Note that heat exchanger 260 is not limited to the case of being installed on upper surface 240c. For example, heat exchanger 260 can be disposed adjacent to one side surface of housing 240, for example, rear surface 240b (described later). In order to dissipate heat from phosphor layer 222 in housing 240, a circulating gas flows inside housing 240, and a flow of the circulating gas communicates between heat exchanger 260 and housing 240. The circulating gas accompanied by the heat generated in phosphor layer 222 is sent into heat exchanger 260 and cooled, and then returns to housing 240 and circulates again to radiate heat of phosphor layer 222 of phosphor wheel 220. As shown in FIG. 6, heat exchanger 260 has circulation flow path 261 through which the circulating gas flows, and outside gas flow path 262 through which an outside gas blown from an outside flows. Circulation flow path 261 and outside gas flow path 262 are configured such that the circulating gas flowing inside and the outside gas flow in thermal contact with each other without being mixed with each other. Fan 232 is installed at an end of heat exchanger 260, for example, near the outside of 260b, and blows air from the outside to outside gas flow path 262. A detailed configuration of heat exchanger 260 will be described later.

(Configuration of Phosphor Wheel 220)

The configuration of phosphor wheel 220 of FIG. 1 will be described below with reference to FIGS. 3 to 5.

Figure 3:
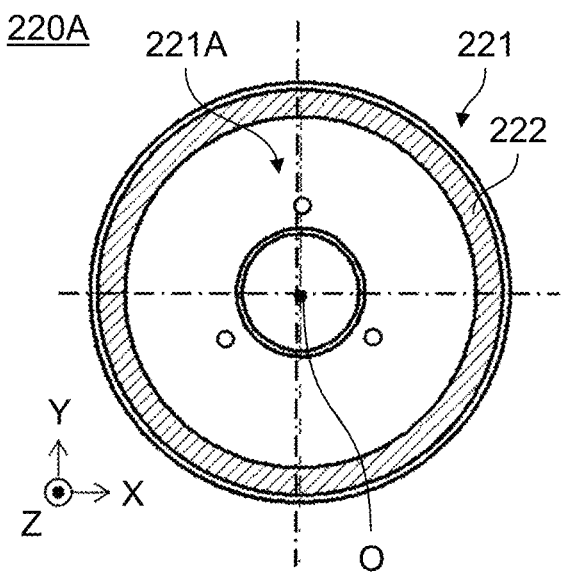
FIG. 3 is a plan view showing a configuration of a light-receiving surface of the phosphor wheel of FIG. 1.

FIG. 3 is a plan view showing the configuration of light-receiving surface 220A of the phosphor wheel of FIG. 1. FIG. 4 is a perspective view showing the configuration of back surface 220B of the phosphor wheel of FIG. 1. FIG. 5 is a partial cross-sectional view of phosphor wheel 220 in the radial direction of FIG. 1.

Figure 5:
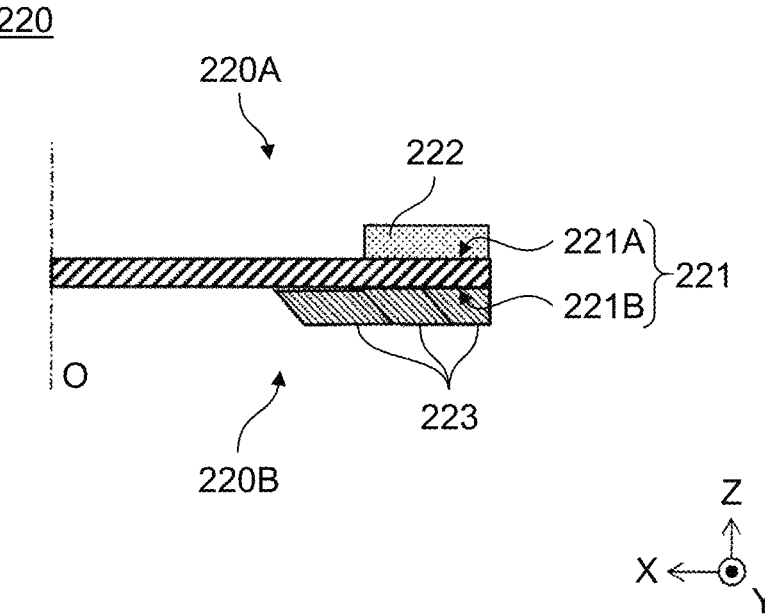
FIG. 5 is a partial cross-sectional view in a radial direction of the phosphor wheel of FIG. 1.

As shown in FIG. 5, phosphor wheel 220 according to the present exemplary embodiment includes substrate 221. Substrate 221 is, for example, disk-shaped, is made of a heat conductive material, has first surface 221A and second surface 221B opposing each other, and can rotate about rotation axis O by driving of motor device 224 (FIG. 1). In the present description, in phosphor wheel 220, the surface (+Z-side surface of FIG. 1 or surface shown in FIG. 2) that receives incident light from semiconductor laser elements 101a to 101c is referred to as "light-receiving surface" or "first surface", and the surface on the opposite side (−Z-side surface in FIG. 1 or surface shown in FIG. 3) is referred to as "back surface" or "second surface".

On light-receiving surface 220A of the phosphor wheel shown in FIG. 3, phosphor layer 222 is annularly formed near the outer periphery of first surface 221A of substrate 221, for example. Phosphor layer 222 is, for example, ceramic, and has a characteristic of generating fluorescent light when excited by blue light.

Figure 4:
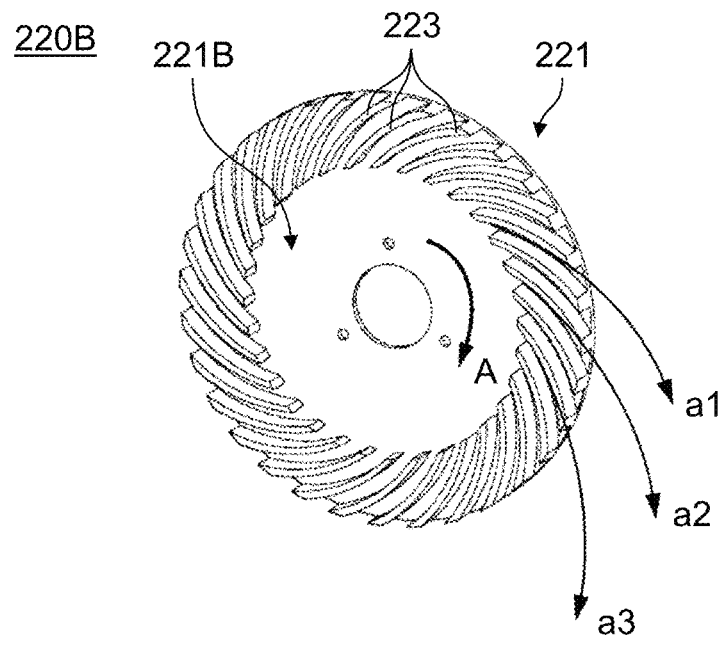
FIG. 4 is a perspective view showing a configuration of a back surface of the phosphor wheel of FIG. 1.

On back surface 220B of the phosphor wheel shown in FIG. 4, a plurality of convex blades 223 are provided on second surface 221B of substrate 221. The plurality of convex blades 223 are disposed rotationally symmetrically such that phosphor wheel 220 stably rotates. In the case of the present exemplary embodiment, as shown in the figure, the plurality of convex blades 223 are curved in rotation direction A of phosphor wheel 220 toward the outer peripheral side of substrate 221. This makes it possible to form a spiral-shaped gap on the second surface of substrate 221. As shown in FIG. 5, convex blades 223 are disposed over a range wider than the range of phosphor layer 222 disposed on first surface 221A of substrate 221 in the radial direction.

That is, the inner periphery of the spiral-shaped gap in second surface 221B of substrate 221 is located closer to the center of substrate 221 than annular phosphor layer 222.

In the case of the present exemplary embodiment, by providing the plurality of curved convex blades 223, an air flow generated when phosphor wheel 220 rotates in direction A can be smoothly guided to the outside in the radial direction in the directions of a1, a2, and a3 from the center of substrate 221 through the spiral-shaped gap. At this time, by effectively blowing air to near the center of back surface 220B of the phosphor wheel, heated phosphor layer 222 on light-receiving surface 220A of the phosphor wheel can be efficiently cooled.

Note that the convex blades installed on second surface 221B of substrate 221 are not limited to a curved shape. A gap may be formed in back surface 220B of phosphor wheel 220, and the convex blades may have any shape that enables an air flow generated by rotation of phosphor wheel 220 to be guided radially outward.

(Configuration of Circulation Path in Phosphor Wheel Device 200)

FIG. 6 is a view showing an example of the circulation path in phosphor wheel device 200 of FIG. 1. In order to facilitate the explanation on the circulation path, FIG. 6 shows a configuration in which heat exchanger 260 is disposed adjacent to rear surface 240b of housing 240. As shown in the figure, in heat exchanger 260, preferably, both ends 260a, 260b are disposed so as to be positioned near both ends (first end and second end) in the longitudinal direction (X-axis direction) of the housing, and more preferably, circulation flow path 261 is disposed adjacent to upper surface 240c or one side surface, for example, rear surface 240b of housing 240. This makes it possible to quickly and effectively cool the circulating gas, and possible to compactly configure phosphor wheel device 200.

As shown in FIG. 6, in the present exemplary embodiment, housing 240) includes first space S1 adjacent to rear surface 240b, second space S2, and third space S3 in which phosphor wheel 220 is disposed. Heat exchanger 260 is disposed such that circulation flow path 261 is adjacent to rear surface 240b of housing 240, communicates with first space S1 at first opening P1, and communicates with third space S3 at fourth opening P4.

Circulation fan 231 is disposed in first space S1. Second space S2 communicates with first space S1 at second opening P2, and communicates with third space S3 at third opening P3. Phosphor wheel 220 is disposed in third space S3.

Arrows C1 to C5 in FIG. 6 indicate the circulation path in housing 240. As shown in the figure, the circulating gas is sent into first space S1 from end 260b of circulation flow path 261 of heat exchanger 260 through first opening P1 (C1), and is sent into second space S2 through second opening P2 by circulation fan 231 installed in first space S1 (C2).

Second space S2 forms a path for sending the circulating gas from first space S1 into third space S3. Circulation fan 231 in first space S1 can be disposed such that the discharge port is closely connected to second opening P2. This makes it possible to quickly send the circulating gas from first space S1 into second space S2 by static pressure of circulation fan 231, and possible to efficiently send it further into third space S3 through third opening P3.

In phosphor wheel 220 in third space S3, preferably, back surface 220B, that is, second surface 221B of substrate 221 is disposed to face second opening P2, and more preferably, third opening P3 is smaller than substrate 221 of phosphor wheel 220 and is disposed toward the center of substrate 221. This makes it possible to suppress the circulating gas sent in from second space S2 from passing through the outer side of the outer periphery of phosphor wheel 220 without touching substrate 221, and possible to effectively blow air to near the center of back surface 220B of the phosphor wheel (C3).

Due to this, as described above with reference to FIG. 4, the circulating gas having been sent in flows radially outward through the gap formed on back surface 220B of the phosphor wheel, whereby heated phosphor layer 222 on light-receiving surface 220A can be efficiently cooled.

Next, the circulating gas accompanied by heat generated in phosphor layer 222 passes through third space S3 (C4), and is sent from end 260a of heat exchanger 260 into circulation flow path 261 through fourth opening P4 from third space S3 (C5).

Thus, housing 240 is compactly configured by spaces S1 to S3, and forms the circulation path indicated by C1 to C5 through which the circulating gas sequentially passes through first space S1, second space S2, and third space S3. This causes phosphor layer 222 of phosphor wheel 220 to effectively radiate heat, and makes it possible to improve space efficiency in phosphor wheel device 200.

Spaces S1 to S3 in housing 240 may be configured to partition the spaces between them, and for example, first space S1 and second space S2 may communicate with each other via only second opening P2, and second space S2 and third space S3 may communicate with each other via only third opening P3. This makes it possible to guide the circulating gas to flow along the circulation direction of C1 to C5 by utilizing the wind pressure by circulation fan 231, and possible to effectively dissipate heat from phosphor layer 222. Housing 240 may further include, for example, a slope (not shown) formed along the circulation path in order to more smoothly guide the circulating gas.

Although circulation fan 231 is an axial fan in FIG. 6, the present invention is not limited to this. In the present exemplary embodiment, a sirocco fan can also be used. Circulation fan 231 using a sirocco fan is small in size and high in static pressure (force for sending air), and can efficiently circulate the circulating gas in the space of housing 240. Note that circulation fan 231 can also be configured by arranging, for example, a plurality of axial fans in series.

Next, the circulating gas sent in from end 260a of heat exchanger 260 flows toward end 260b and passes through circulation flow path 261 (D1). At this time, the gas blown from the outside by fan 232 flows in outside gas flow path 262 in thermal contact with circulation flow path 261 (D2). Due to this, while the circulating gas passes through circulation flow path 261, the circulating gas is cooled by exchanging heat with the outside gas, and the cooled circulating gas returns to first space S1 again through first opening P1 and circulates in housing 240. Thus, the circulation path sequentially passing through spaces S1 to S3 in housing 240 and circulation flow path 261 in heat exchanger 260 constitute a closed flow path through which the circulating gas flows, and the gas circulating in the closed flow path cools phosphor layer 222 that has generated heat as a refrigerant.

Preferably, as shown in FIG. 6, the circulating gas is sent into circulation flow path 261 from end 260a and passes through circulation flow path 261 in direction D1 toward end 260b, and the outside gas is blown into outside gas flow path 262 from end 260b and passes through outside gas flow path 262 in direction D2 toward end 260a. This enables effective heat exchange between the circulating gas in circulation flow path 261 and the outside gas in outside gas flow path 262 while passing through heat exchanger 260.

(Configuration of Heat Exchanger 260)

The configuration of heat exchanger 260 of phosphor wheel device 200 of FIG. 1 will be described below with reference to FIGS. 7 to 10.

Figure 7:
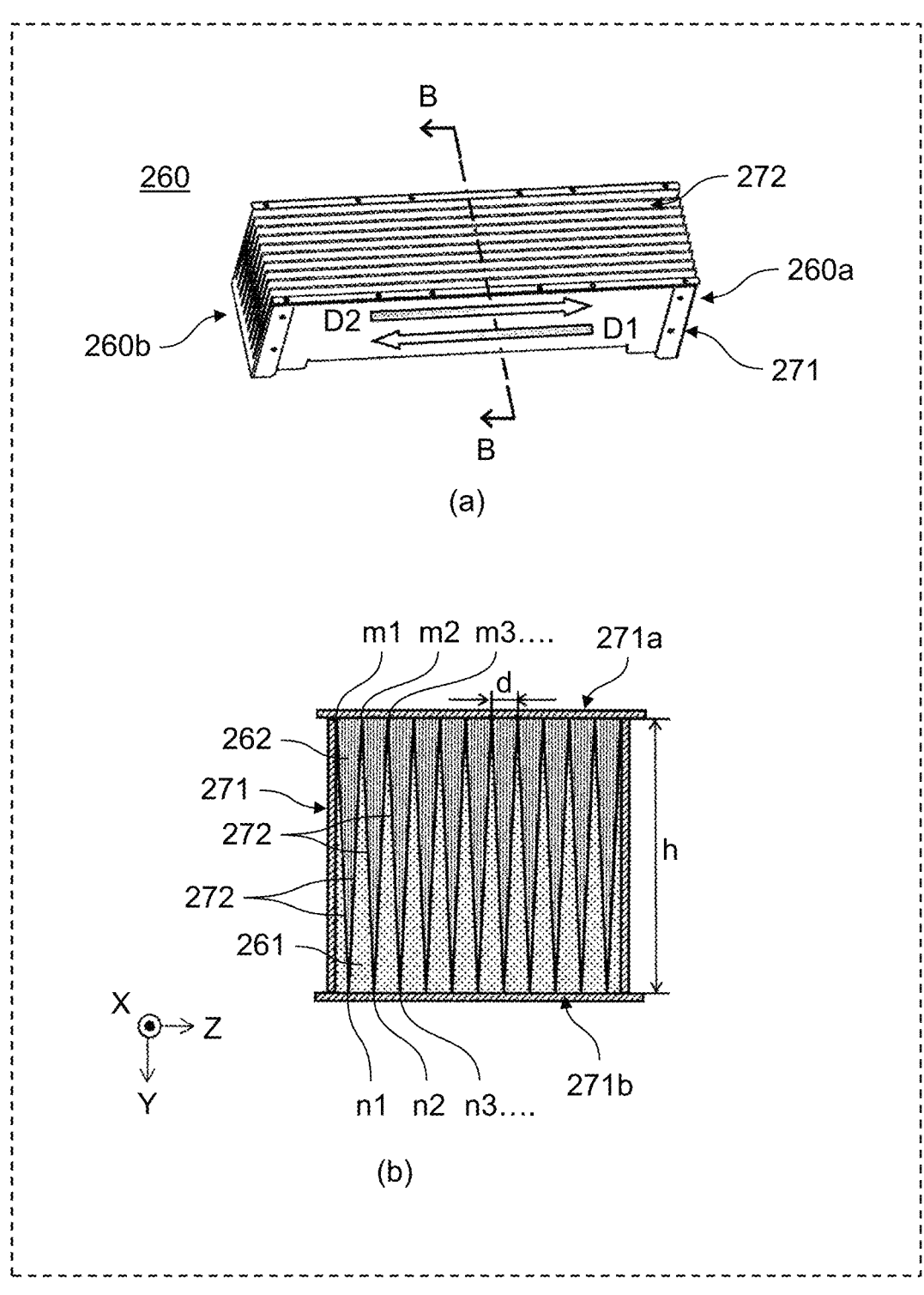
FIG. 7 is a perspective view (a) showing a configuration of a heat exchanger of the phosphor wheel device of FIG. 1, and a cross-sectional view (b) taken along a face B-B.
Figure 8:
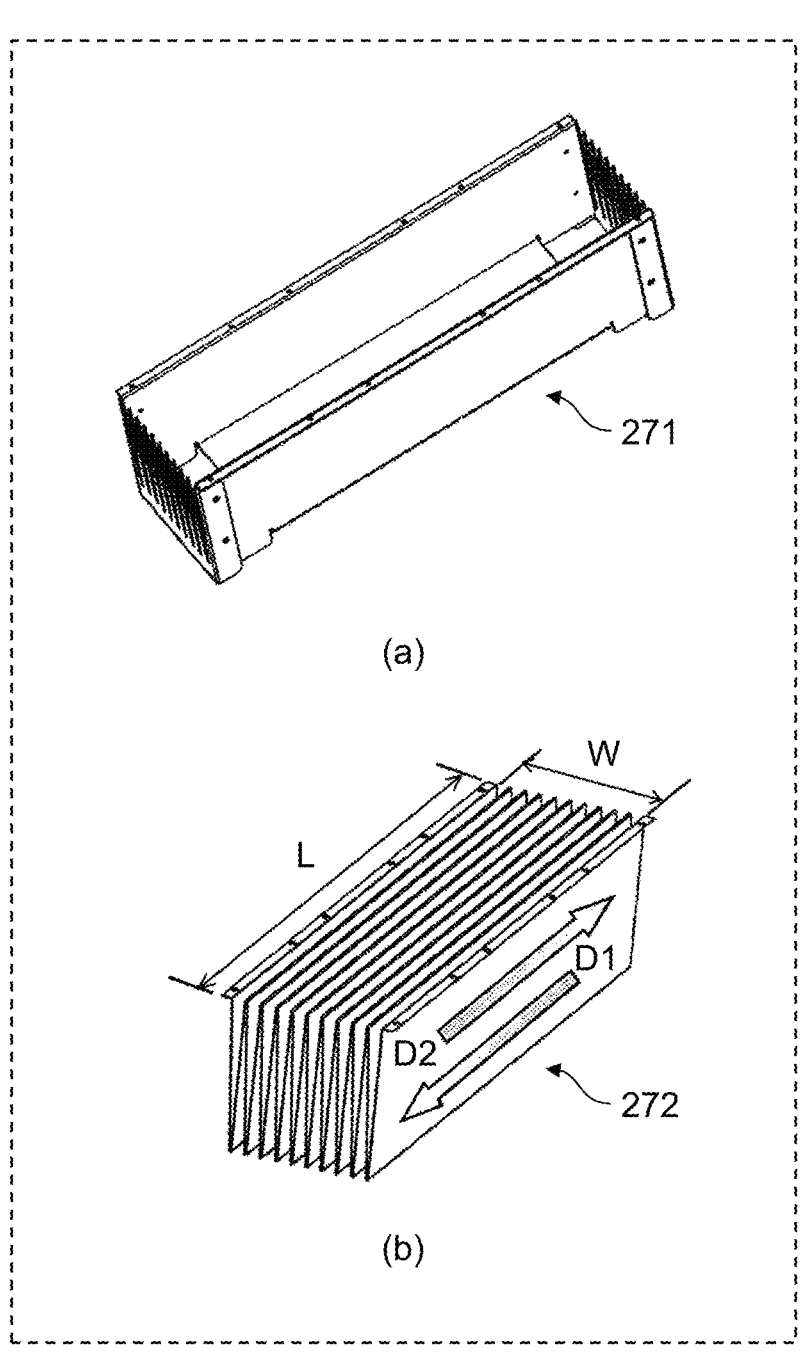
FIG. 8 is a perspective view showing a case (a) and a corrugated plate (b) of the heat exchanger of the phosphor wheel device of FIG. 1.

FIG. 7 is a perspective view (a) showing the configuration of heat exchanger 260 of phosphor wheel device 200 of FIG. 1, and a cross-sectional view (b) taken along the face B-B. FIG. 8 is a perspective view showing a case (a) and a corrugated plate (b) of heat exchanger 260 of phosphor wheel device 200 of FIG. 1. FIG. 8A shows case 271 of heat exchanger 260 with the upper surface removed.

As shown in FIG. 7A, heat exchanger 260 can include case 271 (FIG. 8A) having a substantially rectangular parallelepiped shape, and corrugated plate 272 (FIG. 8B) installed in case 271. The circulating gas and the outside gas flow along longitudinal directions D1 and D2 between both ends 260*a*, 260*b* of heat exchanger 260. The inlet or outlet of the circulating gas and the outside gas may be formed at both ends 260*a*, 260*b*, or may be formed at the upper surface or the bottom surface near both ends 260*a*, 260*b* (shown in FIGS. 9 and 10 described later).

As shown in FIGS. 7A and 7B, corrugated plate 272 has a shape in which a thin plate is repeatedly bent with alternately changing orientation, and is disposed between circulation flow path 261 and outside gas flow path 262. Corrugated plate 272 has a first end surface and a second end surface opposing each other. As shown in the figure, a first end surface and a second end surface in a zigzag shape configured by side m1*n*1, side n1*m*2, side m2*n*2, side n2*m*3, and side m3*n*3 . . . formed by repeated bending are disposed at both ends 260*a*, 260*b* (first end and second end) of heat exchanger 260. Corrugated plate 272 forms a large number of vertically divided grooves extending in the X-direction in the figure inside heat exchanger 260, and the gas flowing along each of the upper and lower grooves can flow between both ends 260*a*, 260*b* of heat exchanger 260 without being mixed with each other. In the present exemplary embodiment, as shown in FIG. 7B a lower surface of corrugated plate 272 and lower surface 271*b* of case 271 constitute circulation flow path 261 through which the circulating gas flows, and an upper surface of corrugated plate 272 and upper surface 271*a* of case 271 constitute outside gas flow path 262 through which the outside gas flows. Circulation flow path 261 and outside gas flow path 262 communicate with each other between both ends 260*a*, 260*b* of heat exchanger 260 (FIG. 7A), and along the communication direction (D1 and D2), circulation flow path 261 is in contact with the lower surface (first corrugated plate surface) of corrugated plate 272, and outside gas flow path 262 is in contact with the upper surface (second corrugated plate surface) of corrugated plate 272. In the example of FIG. 7, circulation flow path 261 is configured such that the circulating gas flows from end 260*a* (first end) toward end 260*b* (second end) of heat exchanger 260. Outside gas flow path 262 is configured such that the outside gas flows from end 260*b* (second end) toward end 260*a* (first end) of heat exchanger 260. However, both the circulating gas and the outside gas may flow from end 260*a* toward end 260*b* of heat exchanger 260, or may flow from end 260*b* toward end 260*a* of heat exchanger 260. That is, circulation flow path 261 is configured such that the circulating gas flows between end 260*a* (first end) and end 260*b* (second end) of heat exchanger 260, and outside gas flow path 262 is configured such that the outside gas flows between end 260*a* (first end) and end 260*b* (second end) of heat exchanger 260.

In the present exemplary embodiment, a large number of grooves extending in the X-direction formed by corrugated plate 272 are arrayed at equal intervals d, but the present disclosure is not limited to this. A large number of grooves may be arrayed at different intervals. In the present exemplary embodiment, the zigzag-shaped end surface of corrugated plate 272 is formed in a repeated V-shaped line shape, but the present disclosure is not limited to this. For example, the zigzag-shaped end surface of corrugated plate 272 may be configured to partially include a curved shape. Furthermore, in the present exemplary embodiment, heights h of the repeated V-shapes on the zigzag-shaped end surface of corrugated plate 272 are formed to be the same, but the present disclosure is not limited to this. The height of the repeating V-shape may be different.

Corrugated plate 272 is prepared of a heat conductive material such as aluminum or SUS. Therefore, the circulating gas flowing in circulation flow path 261 and the outside gas flowing in outside gas flow path 262 are not mixed with each other, and flow in thermal contact with each other via corrugated plate 272 along the extending direction of corrugated plate 272. By forming the end surface of corrugated plate 272 in a zigzag shape, the surface area of thermal contact between circulation flow path 261 and outside gas flow path 262 increases, and it is possible to improve the efficiency of heat exchange between the circulating gas and the outside gas.

The effect of heat exchange is improved as the material constituting corrugated plate 272 is thinner. In order to retain corrugated plate 272 at a constant strength, corrugated plate 272 may be prepared using, for example, an aluminum foil having a thickness of about 0.05 mm or an aluminum plate having a thickness of about 0.5 mm in the present exemplary embodiment. Array interval d of the large number of grooves extending in the X-direction formed by corrugated plate 272 is not limited to this, and may be, for example, more than or equal to 4 mm, and height h of the repeated V-shape in the zigzag-shaped end surface may be, for example, more than or equal to 40 mm. Since the heat exchange function of heat exchanger 260 is defined by the dimension of corrugated plate 272, corrugated plate 272 may be designed based on a required cooling function according to the output of phosphor wheel device 200. However, it is needless to say that the capacities of circulation fan 231 and fan 232 need to be considered for the amount of heat that can be coped with.

Such heat exchanger 260 effectively cools the circulating gas with a simple structure, and the cooled circulating gas returns to housing 240 and circulates, and thus the heat generated when the phosphor emits light can be cooled inexpensively. As shown in FIG. 7, heat exchanger 260 may be configured by separately preparing and assembling case 271 and corrugated plate 272, and for example, circulation flow path 261 including the case and outside gas flow path 262 may be integrally formed by insert molding or the like. Hereinafter, an integrated configuration of heat exchanger 260 will be described with reference to FIGS. 9 and 10.

Figure 9:
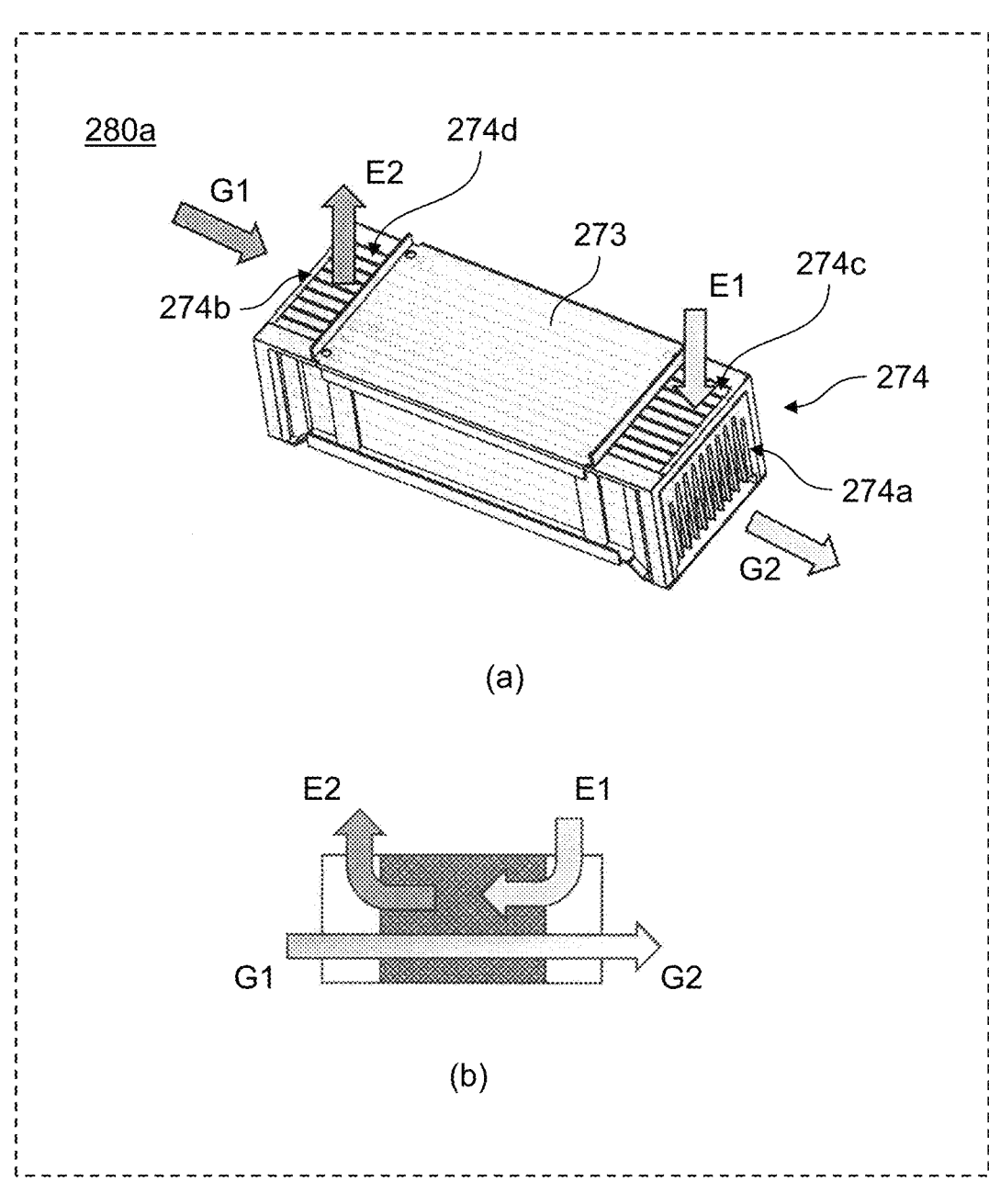
FIG. 9 is a perspective view (a) showing an example of an integrated configuration of the heat exchanger of the phosphor wheel device of FIG. 1, and a view (b) showing a flow of gas at an inlet or outlet.
Figure 10:
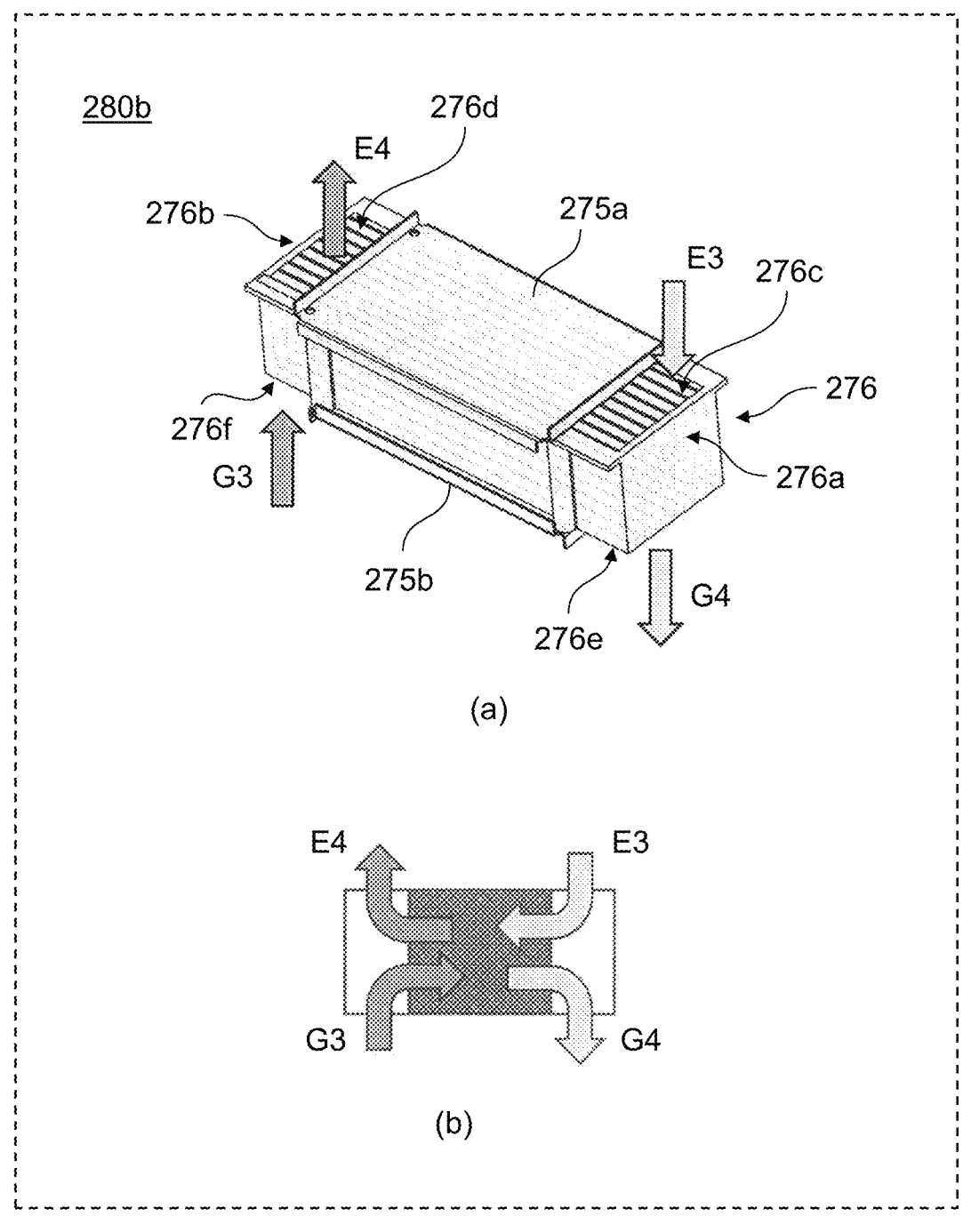
FIG. 10 is a perspective view (a) showing another example of an integrated configuration of the heat exchanger of the phosphor wheel device of FIG. 1, and a view (b) showing a flow of gas at an inlet or outlet.

FIG. 9) is a perspective view (a) showing an example of an integrated configuration of the heat exchanger of phosphor wheel device 200 of FIG. 1, and a view (b) showing a flow of gas at an inlet or outlet. FIG. 10 is a perspective view (a) showing another example of an integrated configuration of the heat exchanger of phosphor wheel device 200 of FIG. 1, and a view (b) showing a flow of gas at an inlet or outlet.

280*a*, which is an example of a heat exchanger having the integrated configuration shown in FIG. 9, is configured by lid 273 and flow path member 274. Flow path member 274 is a member in which circulation flow path 261 including the case and outside gas flow path 262 are integrally prepared as one component by, for example, insert molding. A manufacturing method such as insert molding can prevent gas leakage due to generation of a gap inside the heat exchanger, and can reduce the number of manufacturing steps, and thus it is possible to reduce the cost for preparation of the heat exchanger.

In heat exchanger 280a shown in FIG. 9, for example, the outside gas flows in the directions of G1 and G2 shown in FIG. 9 with ends 274a, 274b of flow path member 274 as an inlet or outlet. Therefore, as shown in FIG. 9A, both ends 274a, 274b of heat exchanger 280a have an open structure. The circulating gas is sent in or sent out from upper surface openings 274c, 274d near ends 274a, 274b of flow path member 274, and flows in the directions of E1 and E2 shown in FIG. 9. That is, as shown in FIG. 9, heat exchanger 280a has an upper surface (first surface), opening 274c (first opening), opening 274d (second opening), and lid 273 (first lid). The upper surface of heat exchanger 280a connects end 274a (first end) and end 274b (second end). Opening 274c is disposed on the upper surface and is adjacent to end 274a of heat exchanger 280a. The circulating gas is sent into opening 274c. Opening 274d is disposed on the upper surface and is adjacent to end 274b of heat exchanger 280a. The circulating gas is sent out from opening 274d. Lid 273 is disposed on the upper surface, is disposed between opening 274c and opening 274d, and covers a part of circulation flow path 261.

280b, which is another example of a heat exchanger having the integrated configuration shown in FIG. 10, is similar to 280a in FIG. 9, and is configured by lid 275a and flow path member 276. Flow path member 276, integrally prepared as one component by insert molding is different from flow path member 274 shown in FIG. 9 in terms of the configuration of the inlet or outlet of the outside gas. In heat exchanger 280b, the outside gas flows in the directions of G3 and G4 shown in FIG. 10, for example, with lower surface openings 276e, 276f near ends 276a, 276b of flow path member 276 as an inlet or outlet. The circulating gas is sent in or sent out from upper surface openings 276c, 276d near ends 276a, 276b of flow path member 276, similarly to flow path member 274 shown in FIG. 9, and flows in the directions of E3 and E4 shown in FIG. 10. In this case, as shown in FIG. 10A, both ends 276a, 276b of heat exchanger 280b are configured by a sealing structure. By providing openings on the upper surface and the lower surface near both ends of flow path member 276 to form an inlet or outlet for the circulating gas or the outside gas, it is possible to further simplify the sealing of ends 276a, 276b of flow path member 276, and it is possible to further reduce the cost for preparation of the heat exchanger. That is, as shown in FIG. 10, heat exchanger 280b has a lower surface (second surface), opening 276e (third opening), opening 276f (fourth opening), and lid 275b (second lid). The lower surface of heat exchanger 280b connects end 276a and end 276b and opposes the upper surface of heat exchanger 280b. Opening 276e is disposed on the lower surface and is adjacent to end 276a of heat exchanger 280b. The outside gas is sent out from opening 276e. Opening 276f is disposed on the lower surface and is adjacent to end 276b of heat exchanger 280b. The outside gas is sent in from opening 276f. Lid 275b is disposed on the lower surface, is disposed between opening 276e and opening 276f, and covers a part of outside gas flow path 262.

As described above, phosphor wheel device 200 configured as described above has the configuration in which the space efficiency is improved, and can cool the phosphor that generates the heat inexpensively.

Second Exemplary Embodiment

Hereinafter, projection image display device 600 according to the second exemplary embodiment of the present disclosure will be described with reference to FIG. 11. In the following description, the same parts as those in the first exemplary embodiment will be omitted.
(Configuration of Projection Image Display Device 600)

Figure 11:
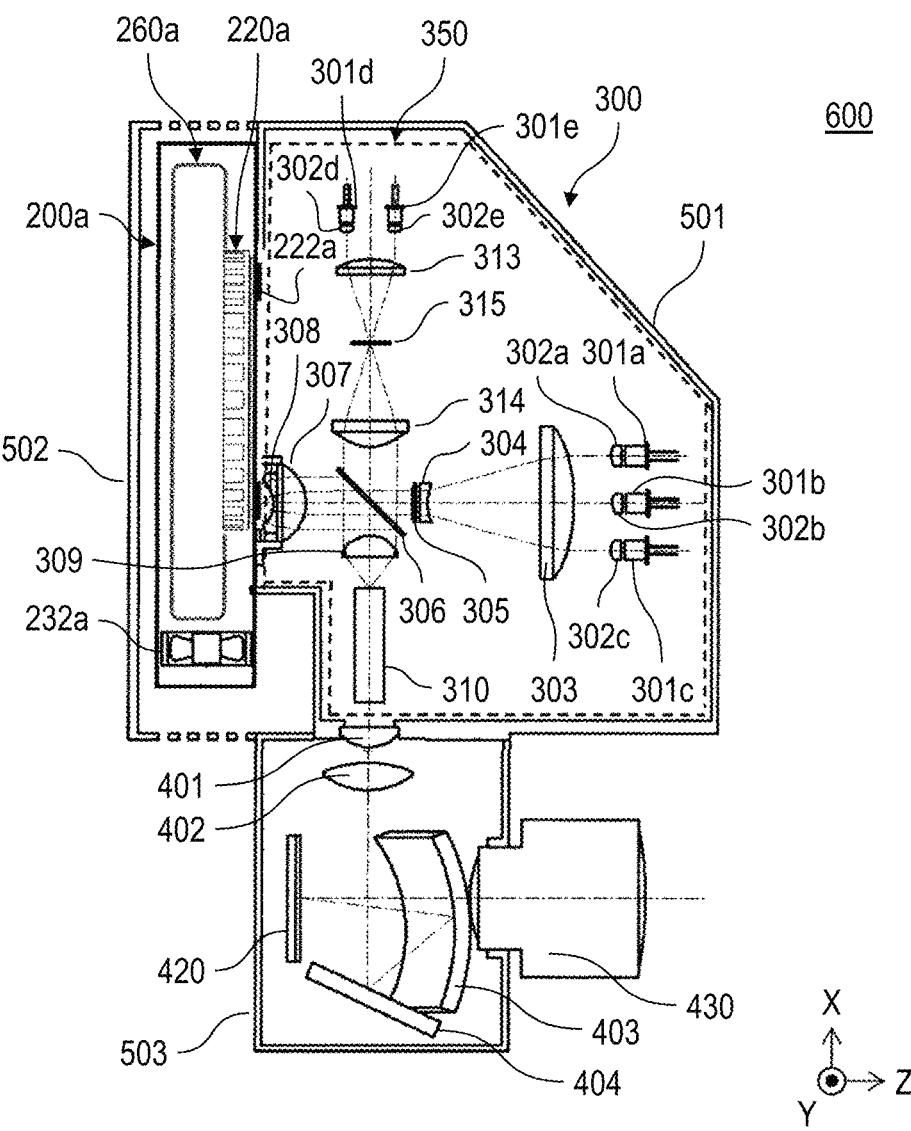
FIG. 11 is a schematic view showing a configuration of a projection image display device according to a second exemplary embodiment.

FIG. 11 is a schematic view showing the configuration of projection image display device 600 of the second exemplary embodiment. Projection image display device 600 may be a high-luminance type projector or a home-use, low-luminance type projector. As shown in FIG. 11, projection image display device 600 includes illumination system 300, light modulation element 420, projection optical system 430, and first to third housings 501, 502, 503 that accommodate them.

Illumination system 300 includes optical system 350 and phosphor wheel device 200a. Phosphor wheel device 200a includes phosphor wheel 220a, and phosphor layer 222a provided on phosphor wheel 220a receives blue light emitted from optical system 350 and generates fluorescent light of yellow light.

As shown in FIG. 11, optical system 350 of illumination system 300 includes semiconductor laser elements 301a, 301b, 301c, 301d, 301e, collimating lenses 302a, 302b, 302c, 302d, 302e, afocal lenses 303, 304, lenses 307, 308, 309, 313, 314, diffuser plates 305, 315, dichroic mirror 306, and rod integrator 310. Phosphor wheel device 200a includes phosphor wheel 220a, heat exchanger 260a, and fan 232a.

In optical system 350, semiconductor laser elements 301a, 301b, 301c may be laser light sources that generate blue light. Blue light emitted from semiconductor laser elements 301a, 301b, 301c is collimated by collimating lenses 302a, 302b, 302c, respectively, and then focused by afocal lenses 303, 304. The focused blue light is incident on diffuser plate 305, is diffused, and is incident on dichroic mirror 306.

Dichroic mirror 306 disposed to be inclined by 45 degrees with respect to the optical axis of incident light has a characteristic of transmitting blue light and reflecting light having an emission color other than blue light. Therefore, the blue light incident from diffuser plate 305 is transmitted through the dichroic mirror, further transmitted through lenses 307, 308, and then incident on phosphor wheel device 200a.

In phosphor wheel device 200a, incident blue light illuminates phosphor layer 222a of phosphor wheel 220a. At this time, phosphor wheel 220a is rotated by a motor (not shown). Due to this, it is avoided that one point of phosphor layer 222a is intensively illuminated with blue light, and deterioration of phosphor particles contained in phosphor layer 222a due to heat generation by irradiation of blue light is suppressed.

The phosphor particles contained in phosphor layer 222a are excited by blue light and emit yellow light. The yellow light is emitted in the Z-direction in the figure and is incident on dichroic mirror 306. The incident yellow light is reflected by dichroic mirror 306, incident on lens 309 in the −X-direction in the figure, and then incident on rod integrator 310.

On the other hand, semiconductor laser elements 301d, 301e each emit blue light, and the emitted blue light is collimated by collimating lenses 302d, 302e, respectively. The collimated blue light is condensed by lens 313 and then substantially collimated by diffuser plate 315. The substantially collimated blue light is transmitted through lens 314, dichroic mirror 306, and lens 309 in this order, and then is incident on rod integrator 310 in the −X-direction in the figure.

As described above, in rod integrator 310, yellow light and blue light are combined, and white light is emitted. Illumination system 300 may include a lens array including a plurality of lenses instead of rod integrator 310.

White light emitted from rod integrator 310 passes through lenses 401, 402 constituting a relay optical system. Next, the white light is reflected by mirrors 403, 404 and is incident on light modulation element 420. Light modulation element 420 spatially modulates the light emitted from phosphor layer 222a based on an image signal, and generates image light corresponding to image information. The image light generated by light modulation element 420 is incident on projection optical system 430 in the +Z-direction in the figure, enlarged by projection optical system 430, and projected and displayed on a display, for example, a screen (not shown).

In the present exemplary embodiment, as shown in FIG. 11, optical system 350 of illumination system 300 is accommodated in first housing 501 for dustproof and soundproofing. Phosphor wheel device 200a is accommodated in second housing 502. Since the periphery of phosphor wheel device 200a generates a large amount of heat, by accommodating phosphor wheel device 200a into second housing 502 separately from other parts of illumination system 300, it is possible to efficiently blow outside gas used as a refrigerant and to improve an effect of heat exchange. Third housing 503 accommodates lenses 401, 402, mirrors 403, 404, light modulation element 420, and projection optical system 430. Light modulation element 420 may be, for example, a digital micromirror device (DMD). Since phosphor wheel device 200a has the same configuration as that of phosphor wheel device 200 according to the first exemplary embodiment described above. a detailed description will be omitted.

In order to downsize projection image display device 600, second housing 502 preferably has a compact configuration. Therefore, phosphor wheel device 200a according to the present disclosure has a configuration with improved space efficiency, and can cool the phosphor that generates the heat inexpensively. Projection image display device 600 using such phosphor wheel device 200a is compact and inexpensive, and can generate and project image light with high power.

Although the present disclosure has been fully described in connection with preferred exemplary embodiments with reference to the accompanying drawings, various modifications can be made within the scope of the claims. Such modifications and exemplary embodiments obtained by appropriately combining technical units disclosed in different exemplary embodiments are also included in the technical scope of the present disclosure.

The present disclosure is applicable to a phosphor wheel device, and is also applicable to an illumination system or a projection image display device including such a phosphor wheel device.

What is claimed is:

1. A phosphor wheel device comprising:
a phosphor wheel;
a housing that accommodates the phosphor wheel; and
a heat exchanger,
wherein
a circulating gas flows between the housing and the heat exchanger,
the housing includes
a circulation fan,
a first space in which the circulation fan is disposed,
a second space to which a gas is sent from the first space by the circulation fan,
a third space in which the phosphor wheel is disposed,
a first opening that gives communication between the heat exchanger and the first space,
a second opening that gives communication between the first space and the second space,
a third opening that gives communication between the second space and the third space, and
a fourth opening that gives communication between the third space and the heat exchanger,
the heat exchanger includes
a circulation flow path through which the circulating gas flows, and
an outside gas flow path through which an outside gas blown from an outside flows,
the housing forms a circulation path through which the circulating gas sequentially passes through the first space, the second space, and the third space,
the circulation path and the circulation flow path form a closed flow path through which the circulating gas flows,
the circulation flow path and the outside gas flow path are configured to cause the circulating gas and the outside gas to flow in thermal contact with each other without being mixed with each other,
the heat exchanger further includes a corrugated plate disposed between the circulation flow path and the outside gas flow path,
the corrugated plate has a shape in which a thin plate is repeatedly bent with alternately changing orientation, and has a first end surface and a second end surface, each of the first end surface and the second end surface having a zigzag shape,
the first end surface and the second end surface are disposed at a first end and a second end of the heat exchanger, respectively, and
the corrugated plate has a first corrugated plate surface and a second corrugated plate surface opposing each other.

2. The phosphor wheel device according to claim 1, wherein
the circulation flow path is configured to cause the circulating gas to flow from the first end toward the second end, and
the outside gas flow path is configured to cause the outside gas to flow from the second end toward the first end.

3. The phosphor wheel device according to claim 2, wherein the heat exchanger further includes
a first surface connecting the first end and the second end,
a first opening that is disposed on the first surface, and is adjacent to the first end of the heat exchanger, the first opening through which the circulating gas is sent in,
a second opening that is disposed on the first surface, and is adjacent to the second end of the heat exchanger, the second opening through which the circulating gas is sent out, and a first lid that is disposed on the first surface, is disposed between the first opening and the second opening, and covers a part of the circulation flow path.

4. The phosphor wheel device according to claim 3, wherein the heat exchanger further includes a second surface connecting the first end and the second end, and opposing the first surface, a third opening that is disposed on the second surface, and is adjacent to the first end of the heat exchanger, the third opening through which the outside gas is sent out, a fourth opening that is disposed on the second surface, and is adjacent to the second end of the heat exchanger, the fourth opening through which the outside gas is sent in, and a second lid that is disposed on the second surface, is disposed between the third opening and the fourth opening, and covers a part of the outside gas flow path.

5. The phosphor wheel device according to claim 1, wherein the first end and the second end of the heat exchanger are adjacent to a first end and a second end of the housing, respectively, in a longitudinal direction of the housing.

6. The phosphor wheel device according to claim 1, wherein the circulation fan is adjacent to the second opening.

7. The phosphor wheel device according to claim 1, wherein the circulation fan is a sirocco fan.

8. The phosphor wheel device according to claim 1, wherein the circulation flow path is adjacent to an upper surface or one side surface of the housing.

9. A projection image display device comprising:

an illumination system including a light source and the phosphor wheel device according to claim 1;

a light modulation element that spatially modulates incident light from the illumination system and generates image light in accordance with image information; and a projection optical system that projects and displays the generated image light.

10. The phosphor wheel device according to claim 1, wherein the circulation path is in contact with the first corrugated plate surface, the outside gas flow path is in contact with the second corrugated plate surface, the circulation flow path is configured to cause the circulating gas to flow between the first end and the second end of the heat exchanger, and the outside gas flow path is configured to cause the outside gas to flow between the first end and the second end of the heat exchanger.

11. The phosphor wheel device according to claim 1, wherein the phosphor wheel includes a substrate that is configured to rotate, and the third opening is smaller than the substrate and is disposed toward a center of the substrate.

12. The phosphor wheel device according to claim 1, further comprising a fan configured to blow the outside gas to the outside gas flow path.

13. The phosphor wheel device according to claim 1, wherein the outside gas flow path is configured to cause the outside gas to flow between a first end of the heat exchanger and a second end of the heat exchanger.

* * * * *